United States Patent
Bonvin et al.

(10) Patent No.: US 8,749,183 B2
(45) Date of Patent: Jun. 10, 2014

(54) DETERMINING A POSITION OF A MOTOR USING AN ON-CHIP COMPONENT

(75) Inventors: Frederic Bonvin, Longmont, CO (US); Agostino Mirabelli, Lomello (IT); Maurizio Nessi, Como (IT)

(73) Assignees: STMicroelectronics, Inc., Coppell, TX (US); STMicroelectronics S.r.l., Agrate Brianza (MB) (IT)

( * ) Notice: Subject to any disclaimer, the term of this patent is extended or adjusted under 35 U.S.C. 154(b) by 332 days.

(21) Appl. No.: 12/552,963

(22) Filed: Sep. 2, 2009

(65) Prior Publication Data

US 2010/0052587 A1 Mar. 4, 2010

Related U.S. Application Data

(60) Provisional application No. 61/093,671, filed on Sep. 2, 2008.

(51) Int. Cl.
H02P 6/16 (2006.01)
H02P 6/18 (2006.01)

(52) U.S. Cl.
USPC .................................. 318/400.3; 318/400.32

(58) Field of Classification Search
USPC ............................ 318/400.01, 400.16, 400.3, 318/400.32–400.36, 700, 720–724
See application file for complete search history.

(56) References Cited

U.S. PATENT DOCUMENTS

| | | | |
|---|---|---|---|
| 2,476,787 A * | 7/1949 | Wellings | 323/358 |
| 3,569,848 A * | 3/1971 | Esteban | 330/256 |
| 3,649,912 A * | 3/1972 | Nakamura | 324/127 |
| 3,947,736 A | 3/1976 | Byers | |
| 3,967,173 A | 6/1976 | Stich | |
| 4,047,083 A | 9/1977 | Plunckett | |
| 4,123,692 A | 10/1978 | Gilmore et al. | |
| 4,668,898 A * | 5/1987 | Harms et al. | 318/400.21 |
| 4,764,711 A * | 8/1988 | Deller | 318/619 |
| 4,804,894 A | 2/1989 | Machida et al. | |
| 5,028,852 A * | 7/1991 | Dunfield | 318/400.33 |
| 5,051,680 A * | 9/1991 | Belanger | 318/701 |
| 5,327,064 A * | 7/1994 | Arakawa et al. | 318/801 |
| 5,374,857 A * | 12/1994 | Carobolante | 327/110 |
| 5,656,897 A * | 8/1997 | Carobolante et al. | 318/400.36 |
| 5,691,613 A * | 11/1997 | Gutwillinger | 318/500 |
| 5,798,624 A * | 8/1998 | Wilke et al. | 388/809 |
| 6,137,253 A | 10/2000 | Galbiati | |
| 6,768,623 B1 | 7/2004 | Shen | |
| 6,777,907 B2 | 8/2004 | Ho | |
| 7,026,774 B2 * | 4/2006 | Inaba et al. | 318/400.33 |
| 7,042,186 B2 | 5/2006 | Stancu et al. | |
| 7,176,644 B2 * | 2/2007 | Ueda et al. | 318/400.14 |
| 7,262,568 B2 * | 8/2007 | Takada | 318/400.3 |
| 7,482,777 B2 * | 1/2009 | Tomigashi | 318/807 |

* cited by examiner

Primary Examiner — Bentsu Ro
(74) Attorney, Agent, or Firm — Graybeal Jackson LLP

(57) ABSTRACT

An embodiment of a motor controller includes first and second supply nodes, a motor-coil node, an isolator, a motor driver, and a motor position signal generator. The isolator is coupled between the first and second supply nodes, and the motor driver is coupled to the second supply node and to the motor-coil node. The motor position signal generator is coupled to the isolator and is operable to generate, in response to the isolator, a motor-position signal that is related to a position of a motor having at least one coil coupled to the motor-coil node. By generating the motor-position signal in response to the isolator, the motor controller or another circuit may determine the at-rest or low-speed position of a motor without using an external coil-current-sense circuit.

21 Claims, 7 Drawing Sheets

US 8,749,183 B2

DETERMINING A POSITION OF A MOTOR USING AN ON-CHIP COMPONENT

CLAIM OF PRIORITY

This application claims priority to U.S. Provisional Application Ser. No. 61/093,671, entitled METHODS AND APPARATUSES FOR REDUCING PURE TONE ACOUSTIC NOISE GENERATION AND FOR SENSING ROTOR POSITION IN BLDC MOTORS, filed Sep. 2, 2008, which is incorporated herein by reference in its entirety.

CROSS REFERENCE TO RELATED APPLICATION

This application is related to U.S. patent application Ser. No. 12/552,989, entitled MOTOR CONTROLLER WITH DRIVE-CURRENT CONDITIONING, filed on Sep. 2, 2009, which application is incorporated herein by reference in its entirety.

SUMMARY

This Summary is provided to introduce, in a simplified form, a selection of concepts that are further described below in the Detailed Description. This Summary is not intended to identify key features or essential features of the claimed subject matter, nor is it intended to be used to limit the scope of the claimed subject matter.

An embodiment of a motor controller includes first and second supply nodes, a motor-coil node, an isolator, a motor driver, and a motor position signal generator. The isolator is coupled between the first and second supply nodes, and the motor driver is coupled to the second supply node and to the motor-coil node. The motor position signal generator is coupled to the isolator and is operable to generate, in response to the isolator, a motor-position signal that is related to a position of a motor having at least one coil coupled to the motor-coil node.

For example, before starting a motor, an embodiment of an integrated motor controller causes a current to briefly flow through at least one of the motor coils, detects this current, generates a position signal in response to this current, and determines a position of the motor from the position signal. Because this coil current also flows through the isolator, the motor controller detects the coil current by detecting the current flowing through the isolator. Detecting the current flowing through the isolator instead of detecting a current flowing through a sense circuit (e.g., a sense resistor) in series with the at least one coil and external to the motor controller may reduce the size, component count, and power dissipation of a system that incorporates the motor controller.

DETAILED DESCRIPTION

Figure 1:
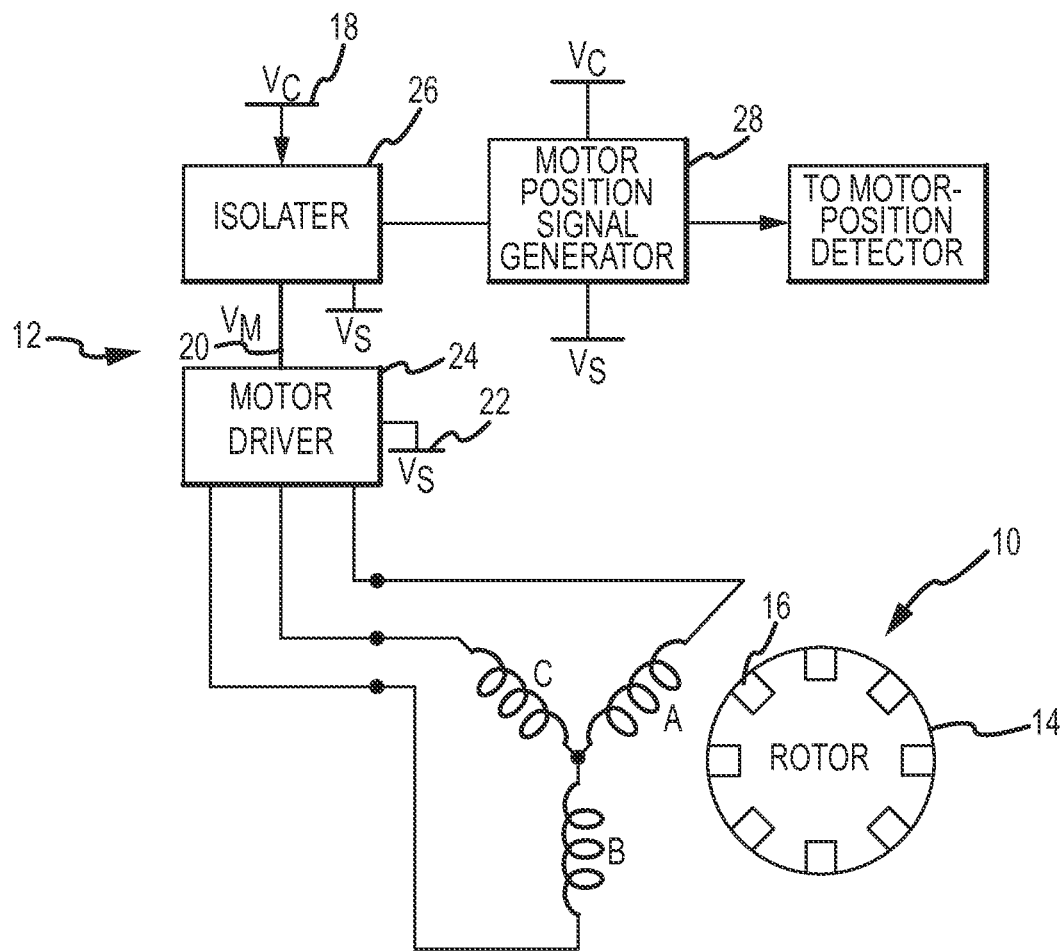
FIG. 1 is a block diagram of a motor and of an embodiment of a motor controller that may detect a position of the motor without an external sense circuit.

FIG. 1 is a block diagram of an embodiment of a motor 10 and a motor controller 12. For example, the motor 10 may be a brushless DC motor, the motor controller 12 may be disposed on an integrated circuit, and the motor controller and the motor may be part of a disk drive that includes at least one data-storage disk rotated by the motor. As discussed below, the motor controller 12 may determine (or may provide information to another circuit that determines) the at-rest or low-speed position of the motor 10 without using a sensing circuit that is external to the motor controller.

The motor 10 is a three-phase motor that includes a rotor 14 and stator windings that may be modelled electrically as three coils A, B, and C. The rotor 14 includes a number (here eight) of magnets 16, which form poles of the motor 10. As discussed below, while the motor 10, or more specifically, the rotor 14 of the motor, is at rest or is rotating at a low speed, the magnets 16 alter the inductance of each of the coils A, B, and C by a respective amount that depends on the position of the rotor. For purposes of this disclosure, the rotor 14 is considered to be rotating at a low speed while the back electromotive force (BEMF) generated by each of the coils A, B, and C is significantly less (e.g., two or more times less) than the respective voltage applied to each of the coils to make the position measurement as described below. For example, a low speed may be considered to be approximately 10% or less of the full operational speed of the rotor 14. Furthermore, the rotor 14 may be rotating before a start-up sequence for a number of reasons. For example, the motor 10 may not have come to a complete stop since a previous shut down sequence. Or, the motor (e.g., a fan motor) may be rotating spontaneously due to outside forces (e.g., the wind).

The motor controller 12 includes first, second, and third supply nodes 18, 20, and 22, for receiving supply voltages $V_C$, $V_M$, and $V_S$, a motor driver 24, an isolator 26, and a motor position signal generator 28.

Although the supply voltages $V_C$, $V_M$, and $V_S$ are described below as being respectively positive, positive, and negative supply voltages, they may be negative, negative, and positive supply voltages, respectively. Furthermore, $V_S$ may be ground regardless of the polarity of $V_C$ and $V_M$.

The motor driver 24 includes circuitry that drives the motor coils A, B, and C with respective currents that cause the rotor 14 to rotate. For example, the motor driver 18 may apply respective pulse-width-modulated (PWM) drive signals to each of the coils.

The isolator 26, while active, couples the second supply node 20 to the first supply node 18 such that $V_M$ approximately equals $V_C$ minus the voltage drop across the isolator. And while inactive, the isolator 26 electrically isolates the $V_M$ supply node 20, and thus the motor driver 24 and the motor 10, from the $V_C$ supply node 18. Therefore, by isolating the supply voltage $V_C$ from the motor 10, the isolator 26 may protect the motor controller 12 from damage if the motor controller detects an excessive current being provided by the supply voltage $V_M$. The isolator 26 may also prevent current flowing from the $V_M$ supply node 20 back to the $V_C$ supply node 18.

The motor position signal generator 28 generates a motor-position signal from which a motor-position detector (not shown) determines the at-rest or substantially instantaneous low-speed position of the motor 10, or, more specifically, the at-rest or low-speed position of the rotor 14 relative to the stator In operation, before starting the motor 10, the motor-position detector (not shown) may determine the position of the rotor 14 and provide to the motor controller 12 information that allows the motor controller to start the motor in a specified rotational direction. Starting the rotor 14 spinning in a specified direction may be required for some applications. For example, a disk drive may malfunction if the spindle motor does not spin the data-storage disk in a specified rotational direction.

As discussed below, the motor-position detector (not shown) may determine the position of the rotor 14 from the inductances of the motor coils A, B, and C.

Generally, it is known that a winding has inductance, and that a magnet in the vicinity of the winding may alter the winding inductance by an amount that depends on the magnet's north-south pole orientation relative to the winding, on the magnet's distance from the winding, and on the magnitude and phase of a current (e.g., for the purpose of determining the motor position) flowing through the winding.

Therefore, it follows that while the motor 10 is unenergized, the magnets 16 alter the inductances of the motor coils A, B, and C by respective amounts that depend primarily on the position of the rotor.

It is also known that the winding inductance L and the voltage V across a winding are related according to the following equation:

$$V = L \cdot (di/dt) \quad (1)$$

Therefore, by applying a known voltage V to a motor coil and measuring the rate of change of current (di/dt) through the coil, one can calculate the inductance L of the coil.

And, using previously obtained inductances of the coils A, B, and C for selected positions of the rotor 14, the motor-position detector (not shown) may determine the rotor position from the measured coil inductances. For example, the motor-position detector may include, or have access to, a look-up table that stores positions of the rotor 14 for corresponding sets of values of the coil inductances.

At the beginning of a start-up sequence for the motor 10, the motor controller 12 may provide the information that the motor-position detector needs to determine the position of the rotor 14 in the following manner.

First, the motor controller 12 activates the isolator 26 to generate a supply voltage $V_M$ on the supply node 20, and deactivates all circuits that draw power from $V_M$ other than the motor driver 24.

Next, the motor driver 24 couples the voltage $V_M$ (or another constant voltage derived from $V_M$) across the series combination of the coils A and B. This causes a current to flow from the supply $V_C$, through the isolator 26, motor driver 24, and coils A and B, to the supply $V_S$.

Then, in response to the isolator 26, the motor position signal generator 28 generates the motor-position signal, which includes information from which the motor-position detector may obtain the di/dt of the current through the coils A and B. For example, as discussed below in conjunction with FIGS. 2-5, the motor-position signal may indicate the value of the current flowing through the coils A and B, or may indicate a time at which the magnitude of this current equals or exceeds a preset reference value.

Next, the motor driver 24 uncouples the coils A and B from the supply node 20 before the current through these coils can significantly influence the rotor motion, and allows this current to decay to substantially zero before proceeding. That is, the motor driver 24 uncouples the coils A and B from the supply node 20 before the current through these coils causes an at-rest rotor 14 to move significantly, or causes a significant change in the velocity of a spinning rotor.

Then, the motor driver 24, the isolator 26, and the motor position signal generator 28 repeat the above steps for each of the following coil pairs, where the first letter of each pair indicates the coil of the pair coupled to the supply node 20: BA, AC, CA, BC, CB.

Next, from the values of the motor-position signals for each of these six coil pairs, the motor-position detector determines the position of the rotor 14, and provides corresponding rotor-position information to the motor controller 12, which, in response to this information, causes the motor driver 24 to apply to the coils A, B, and C a start-up sequence of PWM signals that causes the rotor 14 to begin spinning in the proper direction.

Therefore, by obtaining information on the coil current from the isolator 26, the motor position signal generator 28 may eliminate the need for an external current-sense circuit, such as an external sense resistor, coupled in series with the coils A, B, and C. And the ability to omit an external sense circuit may allow a designer to reduce the power dissipation, size, and component count of a system that includes the motor controller 12.

Still referring to FIG. 1, alternate embodiments are contemplated. For example, the motor 10 may be a-type of motor other than a brushless DC motor, may have more or fewer than three coils, and may have more or fewer than eight poles. Furthermore, although the current through a motor coil is described as being linear per equation (1), the above-described technique may be used even if the coil currents are non-linear.

Figure 2:
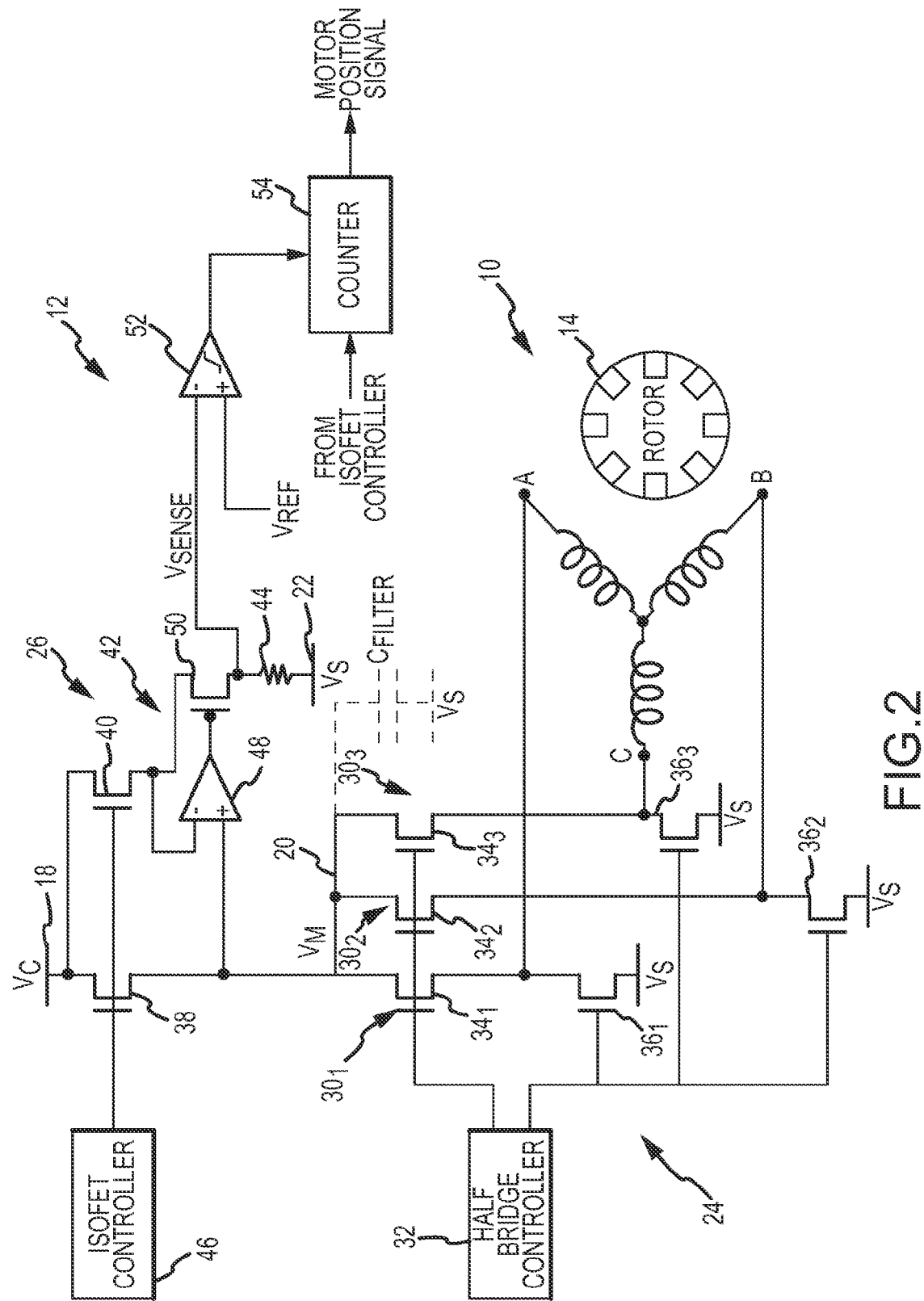
FIG. 2 is a schematic diagram of the motor and of an embodiment of the motor controller of FIG. 1.

FIG. 2 is a schematic diagram of the motor 10 and of an embodiment of the motor controller 12 of FIG. 1, where like numbers are reference components common to FIGS. 1 and 2.

The motor driver 24 includes three half-bridges $30_1$-$30_3$ and a half-bridge controller 32. Each half bridge 30 includes a respective high-side NMOS transistor 34 coupled between the $V_M$ supply node 20 and a respective one of the motor-coil nodes, and a respective low-side NMOS transistor 36 coupled between a respective one of the motor-coil nodes and the $V_S$ supply node 22. The half-bridge controller 32 is coupled to the gates of the transistors $34_1$-$34_3$ and $36_1$-$36_3$, and is operable to switch the transistors 34 and 36 in at least one sequence that causes the rotor 14 to rotate in a desired direction and at a desired speed.

The isolator 26 includes an NMOS transistor 38 (sometimes called an ISOFET) coupled between the $V_C$ and $V_M$ supply nodes 18 and 20, a sense NMOS transistor 40 (sometimes called a SENSEFET), a bias circuit 42, a sense circuit 44, and an ISOFET controller 46 coupled to the gates of the transistors 38 and 40.

The ISOFET 38 has a size (e.g., a width) that is a factor N times larger than the size (e.g., a width) of the SENSEFET 40 such that ideally, the SENSEFET conducts 1/N of the current conducted by the ISOFET. Therefore, the SENSEFET 40 allows sensing of the current through the ISOFET 38 without placing a sense circuit (e.g., a sense resistor) in series with the ISOFET.

The bias circuit 42 includes an operational amplifier 48 and a PMOS transistor 50, which are arranged to maintain the source of the SENSEFET 40 at substantially the same voltage as the source of the ISOFET 38. Maintaining substantially the same voltage at the sources of the ISOFET 38 and SENSEFET 40 may cause the SENSEFET to more closely conduct $1/N^{th}$ of the current flowing through the ISOFET.

The sense circuit 44, which may be an impedence element such as a resistor, conducts the current that is flowing through the SENSEFET 40, and converts this current into a sense voltage $V_{SENSE}$, which is proportional to the current flowing through the ISOFET 38. Therefore, the sense circuit 44 allows sensing the current through the ISOFET 38 without a sense circuit that is external to the motor controller 12.

The motor position signal generator 28 includes a comparator 52 and a counter 54. The comparator 52 has one input node (e.g., a non-inverting input node) coupled to receive $V_{SENSE}$, another input node (e.g., an inverting input node) coupled to receive a reference voltage $V_{ref}$, and an output node coupled to a disable node of the counter 54. The counter 54 also has an enable node coupled to the ISOFET controller 46 and an output node for providing the motor-position signal. The counter 54 may also receive a clock signal, which is omitted from FIG. 2.

Furthermore, an optional filter capacitor $C_{FILTER}$ may be coupled between the $V_M$ and $V_S$ supply nodes 20 and 22.

Still referring to FIG. 2, during a start-up sequence for the motor 10, the motor controller 12 may provide the information that the motor-position detector (not shown) needs to determine the position of the rotor 14 in the following manner.

First, the ISOFET controller 46 activates the ISOFET 38 to generate the supply voltage $V_M$ on the supply node 20, deactivates all circuits that draw power from $V_M$ other than the motor driver 24, activates the SENSEFET 40, and causes the counter 54 to begin counting from a preset value (e.g., zero).

Next, the half-bridge controller 32 activates the high-side transistor $34_1$ to couple the motor coil A to $V_M$, and activates the low-side transistor $36_2$ to couple the coil B to $V_S$. This causes a current to flow from the supply $V_C$, through the ISOFET 38, the transistor $34_1$, the coils A and B, and the transistor $36_2$, to the supply $V_S$. The half-bridge controller 32 maintains the other transistors $34_2$-$34_3$ and $36_1$ and $36_3$ in deactivated states. If the capacitor $C_{FILTER}$ is present, then an exponentially decaying charging current flows into this capacitor. But it is theorized that for typical values (e.g., 100 microfarads or less) of $C_{FILTER}$, this charging current can be ignored such that one may assume that the current through the ISOFET 38 substantially equals the current through the coils A and B.

Then, the comparator 52 compares the sense voltage $V_{SENSE}$ across the sense circuit 44 to $V_{ref}$ and, in response to $V_{SENSE}$ equalling or being greater than $V_{ref}$ the comparator transitions the signal on its output node from, e.g., a logic low level to, e.g., a logic high level.

Next, in response to the comparator 52 transitioning its output signal from, e.g., a logic low level to a logic high level, the counter 54 stops counting, and provides its final count value $CV_{Final}$ to the motor-position detector (not shown) as the motor-position signal. Furthermore, although not shown, the comparator output node may be coupled to the ISOFET controller 46, which may deactivate the ISOFET 38 in response to the transition of the comparator output signal so that the current through the coils A and B stops flowing before the rotor 14 rotates a significant amount. Alternatively, the comparator output node may be coupled to the half-bridge controller 32, which may deactivate one or both of the transistors 341 and 361 in response to the transition of the comparator output signal so that the current through the coils A and B stops flowing before the rotor 14 moves a significant distance.

Then, the motor-position detector (not shown) determines di/dt of equation (1). The motor-position detector is calibrated so that it "knows" the value I of the current through the ISOFET 38 when $V_{SENSE}$ equals $V_{ref}$, and the final count value $CV_{Final}$ represents the time during which the current through the ISOFET went from zero to 1. Because the motor coils A and B are primarily inductive and the voltage $V_M$-$V_S$ applied across the coils A and B is substantially constant, the motor-position detector may "assume" that the current through the ISOFET 38 rose substantially linearly. Therefore, di/dt is approximated by the following equation:

$$di/dt = CV_{Final} \qquad (2)$$

Then, the motor driver 24, the isolator 26, and the motor position signal generator 28 repeat the above steps for each of the remaining coil pairs, and the motor-position detector determines the position of the rotor 14 from the determine di/dt values and provides this position to the motor controller 12. In response to the received rotor position, the motor controller 12 causes the half-bridge controller 32 to apply to the coils A, B, and C a start-up sequence of PWM signals that starts the rotor 14 spinning in the proper direction, or that increases the speed of the rotor in the proper direction.

As stated above, even if di/dt through one or more of the motor coils is not linear per equation (2), the motor-position detector may still determine the rotor position by conventionally determining the rotor position based, at least in part, on the signs of the differences between the positive and negative currents through the same pairs of coils (e.g., AB, BA).

Still referring to FIG. 2, alternate embodiments are contemplated. For example, at least one of the alternate embodiments discussed above in conjunction with FIG. 1 may apply to the motor 10 and the motor controller 12 of FIG. 2. Furthermore, some or all of the transistors 34, 36, 38, and 40 may be PMOS transistors or any other types of transistors, and the transistor 50 may be an NMOS transistor or any other type of transistor. In addition, the comparator 52 may be a current-input comparator such that the sense circuit 44 may be omitted, and the reference voltage $V_{ref}$ may be replaced with a reference current. Moreover, the output of the comparator 52 may be used as a current-limiter signal during operation of the motor 10. In response to $V_{SENSE}$ being greater than $V_{ref}$, the output of the comparator 52 transitions to a logic high level as described above. In response to the logic high level at the output of the comparator 52, the half-bridge controller 32 may iteratively reduce the drive to the high-side transistors 34 until the output of the comparator transitions back to a logic low level. Therefore, the motor controller 24 may maintain itself and the motor 10 operating in a safe region without shutting itself and the motor 10 down. Alternatively, the motor controller 24 may completely shut down the motor 10 in response to the logic high level at the output of the comparator 52.

Figure 3:
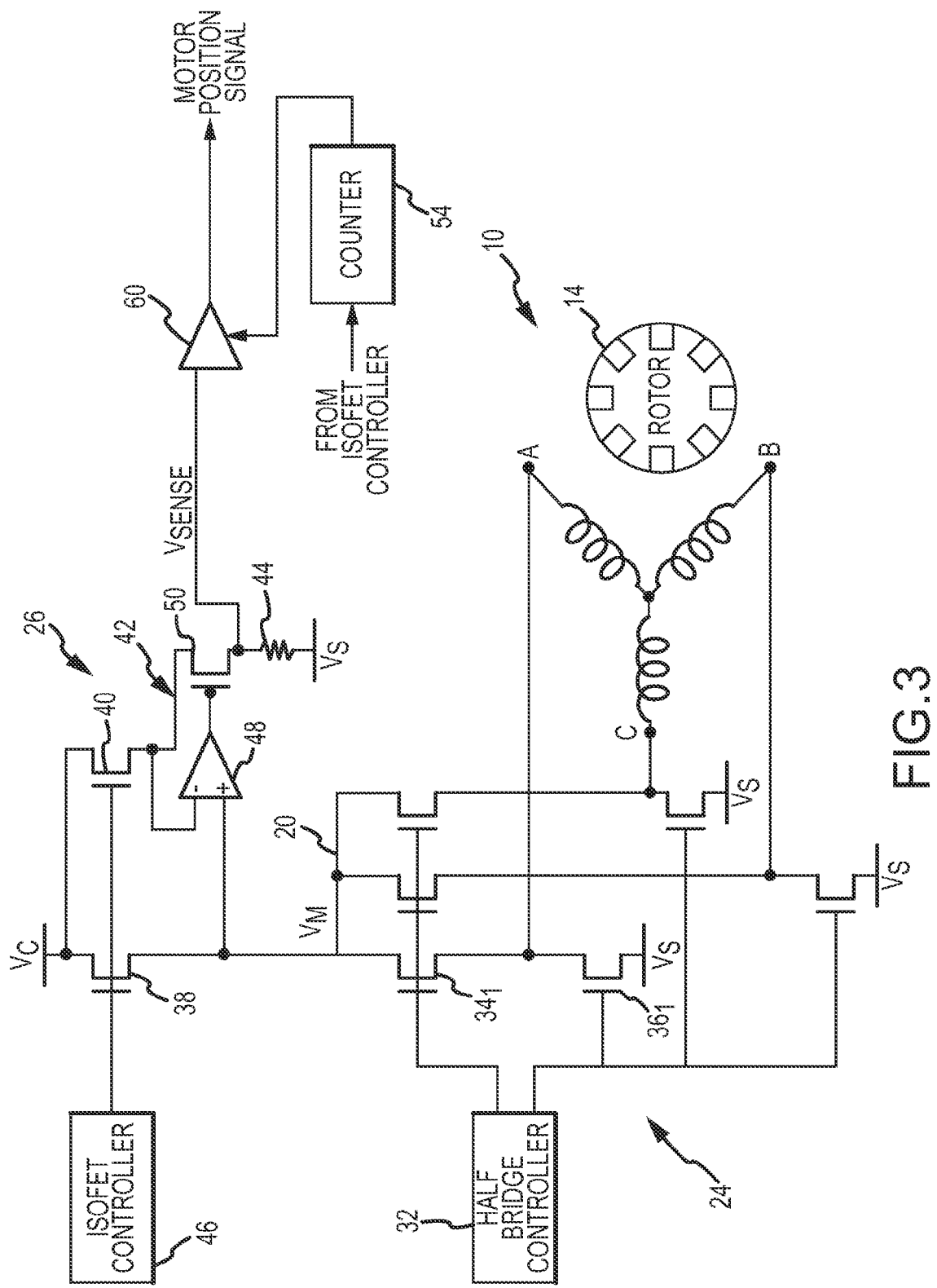
FIG. 3 is a schematic diagram of the motor and of another embodiment of the motor controller of FIG. 1.

FIG. 3 is a schematic diagram of the motor 10 and of an embodiment of the motor controller 12 of FIG. 1, where like numbers are used to reference components common to FIGS. 1-3.

The motor controller 12 of FIG. 3 may be similar to the motor controller of FIG. 2 except that instead of providing a final count value $CV_{Final}$ for a known value of current, the motor position signal generator 28 provides a value I of current for a known count value (i.e., a known period of time), or multiple values I over a known time range.

The motor position signal generator 28 includes the counter 54 and an amplifier 60 in place of the comparator 52 of FIG. 2.

In operation during a motor start-up procedure, the ISOFET controller 46 activates the ISOFET 38 to generate the supply voltage $V_M$ on the supply node 20, deactivates all circuits that draw power from $V_M$ other than the motor driver 24, activates the SENSEFET 40, and causes the counter 54 to begin counting from a first preset value (e.g., zero) to a second preset value CP.

Next, the half-bridge controller 32 activates the high-side transistor $34_1$ to couple the motor coil A to $V_M$, and activates the low-side transistor $36_2$ to couple the coil B to $V_S$. This causes a current to flow from the supply $V_C$, through the ISOFET 38, the transistor $34_1$, the coils A and B, and the transistor $36_2$, to the supply $V_S$.

Then, the amplifier 60 generates the motor-position signal proportional to $V_{SENSE}$, which is proportional to the current I through the ISOFET 38.

In response to the count value equalling the second preset value CP, the counter 54 transitions a signal on its output node to cause the amplifier 60 to latch as the motor-position signal the voltage on the amplifier output node. Therefore, in this embodiment, the motor-position signal is a voltage that represents the value of the current through the ISOFET 38, and thus the current through the coils A and B, at a time represented by CP. The amplifier 60 may provide the motor-position signal in digital form, or may include a sample-and-hold circuit that provides the motor-position signal as an analog signal. Furthermore, although not shown, the counter 54 output node may be coupled to the ISOFET controller 46, which may deactivate the ISOFET 38 in response to the transition of the counter output signal so that the current through the coils A and B stops flowing before the rotor 14 rotates a significant amount. Alternatively, the counter 54 output node may be coupled to the half-bridge controller 32, which may deactivate one or both of the transistors $34_1$ and $36_2$ in response to the transition of the comparator output signal so that the current through the coils A and B stops flowing before the rotor 14 rotates a significant amount.

Then, the motor-position detector (not shown) determines di/dt of equation (1) as follows. The motor-position detector is calibrated so that it "knows" the count value CP, and the motor-position signal output from the amplifier 60 represents the current I through the ISOFET 38 at the time represented by CP. Therefore, di/dt is given by the following equation:

$$di/dt = I/CP \quad (3)$$

Next, the motor driver 24, the isolator 26, and the motor position signal generator 28 repeat the above steps for each of the remaining coil pairs, and the motor-position detector determines the position of the rotor 14 from the determined di/dt values and provides this position to the motor controller 12. In response to the received rotor position, the motor controller 12 causes the half-bridge controller 32 to apply to the coils A, B, and C a start-up sequence of PWM signals that starts or maintains the rotor 14 spinning in the proper direction.

Still referring to FIG. 3, alternate embodiments are contemplated. For example, at least one of the alternate embodiments discussed above in conjunction with FIGS. 1-2 may apply to the motor 10 and the motor controller 12 of FIG. 3. Furthermore, the amplifier 60 may be a current-input amplifier such that the sense circuit 44 may be omitted. In addition, the output of the amplifier 60 may be used to limit the current through the motor coils in a manner similar to that described above in conjunction with FIG. 2. Moreover, instead of causing the latching only one value of the amplifier 60 output voltage at time CP, the counter 54 may cause the latching of multiple values of the amplifier output voltage (representing multiple values of the ISOFET, and thus the coil, current), and the motor-position detector may use an average or another function of these voltages to determine the motor position.

For example, the counter 54 may cause the latching of values of the amplifier 60 output voltage over a period of time that is centred around CP. Furthermore, as discussed above in conjunction FIG. 2, the motor-position detector may determine the rotor position even if di/dt through one or more of the motor coils is nonlinear.

Figure 4:
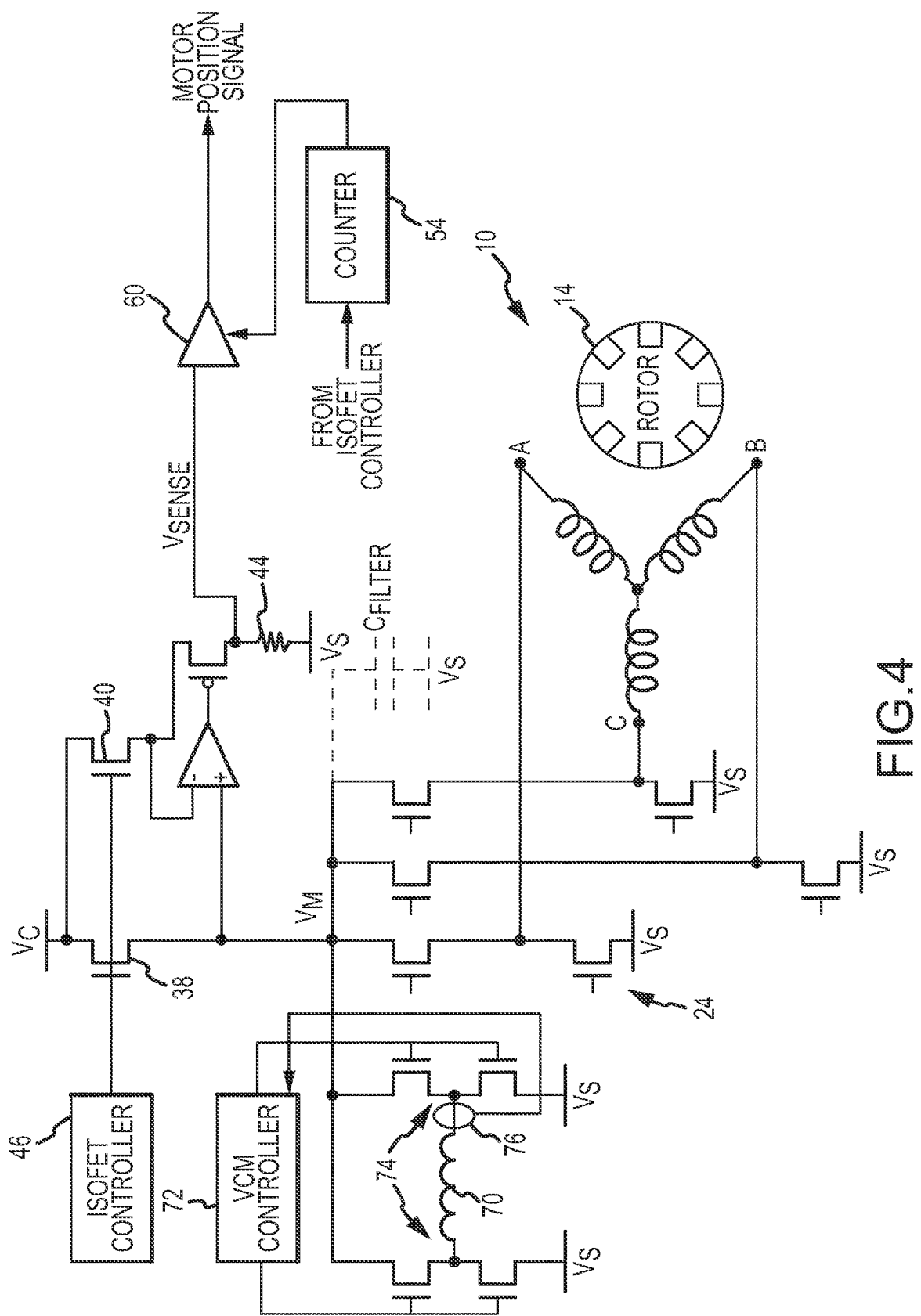
FIG. 4 is a schematic diagram of the motor and of another embodiment of the motor controller of FIG. 1.

FIG. 4 is a schematic diagram of the motor 10, an embodiment of the motor controller 12 of FIG. 1, and of a voice-coil motor (VCM) 70, where like numbers are used reference components common to FIGS. 1-4. In a disk drive, the VCM 70 may be used to move the arm to which the read-write head is attached.

The motor controller 12 of FIG. 4 may be similar to the motor controller of FIG. 3 except that it also includes a voice-coil-motor (VCM) controller 72, a VCM driver 74, and a VCM current sensor 76. The VCM controller 72 may be a current-mode controller, which allows the VCM controller to cause a specified current to flow through the VCM 70 with a relatively high level of accuracy, for example, with a resolution of twenty four bits.

Due to manufacturing tolerances and environmental conditions (e.g., temperature), the actual current scale factor $N_{ACTUAL}$ between the ISOFET 38 and the SENSEFET 40 may differ significantly from the designed-for scale factor $N_{DESIGN}$.

Therefore, without determining the actual value $N_{ACTUAL}$ for the motor controller 12, the motor-position signal may not be accurate enough to allow the motor-position detector (not shown) to determine the at-rest position of the rotor 14 within a specified degree of accuracy.

But the motor controller 12 may use the VCM controller 70 to accurately determine $N_{ACTUAL}$ as follows.

First, the motor controller 12 deactivates the motor driver 24 and all other circuits coupled to the supply node 20.

Next, the ISOFET controller 46 activates the ISOFET 38 and the SENSEFET 40.

Then, the VCM controller 72 causes the VCM driver 74 to drive the VCM 70 with a known value of current IVCM, which also flows through the ISOFET 38—as discussed above in FIG. 2, any charging current flowing into the optional filter capacitor $C_{FILTER}$ may be ignored, or the VCM controller 72 may cause IVCM to flow long enough to substantially fully charge $C_{FILTER}$ before the measurement of $V_{SENSE}$ is made as discussed below.

Next, after a time sufficient to allow IVCM to settle, the motor controller 12 latches the voltage at the output of the amplifier 60, this voltage representing the current $I_{sense}$ flowing through the SENSEFET 40.

Then, the motor controller 12 may calculate the actual scale factor $N_{ACTUAL}$ according to the following equation:

$$N_{ACTUAL} = IVCM/(V_{SENSE}/\text{Impedance}_{44}) \quad (4)$$

Next, the motor controller 12 stores $N_{ACTUAL}$ for use in calculating the value I of equation (3) according to the following equation:

$$I = N_{ACTUAL} \cdot (V_{SENSE}/\text{Impedance}_{44}) \quad (5)$$

To use this technique for calculating $N_{ACTUAL}$ with the motor controller 12 of FIG. 2, one may modify the motor controller of FIG. 2 to include an amplifier coupled to receive $V_{SENSE}$.

Still referring to FIG. 4, alternate embodiments are contemplated. For example, at least one of the alternate embodiments discussed above in conjunction with FIGS. 1-3 may apply to the motor 10 and the motor controller 12 of FIG. 4. Furthermore, a circuit other than the VCM controller 72 may be used to determine the actual value $N_{ACTUAL}$ of the scale factor between the ISOFET 38 and the SENSEFET 40.

Figure 5:
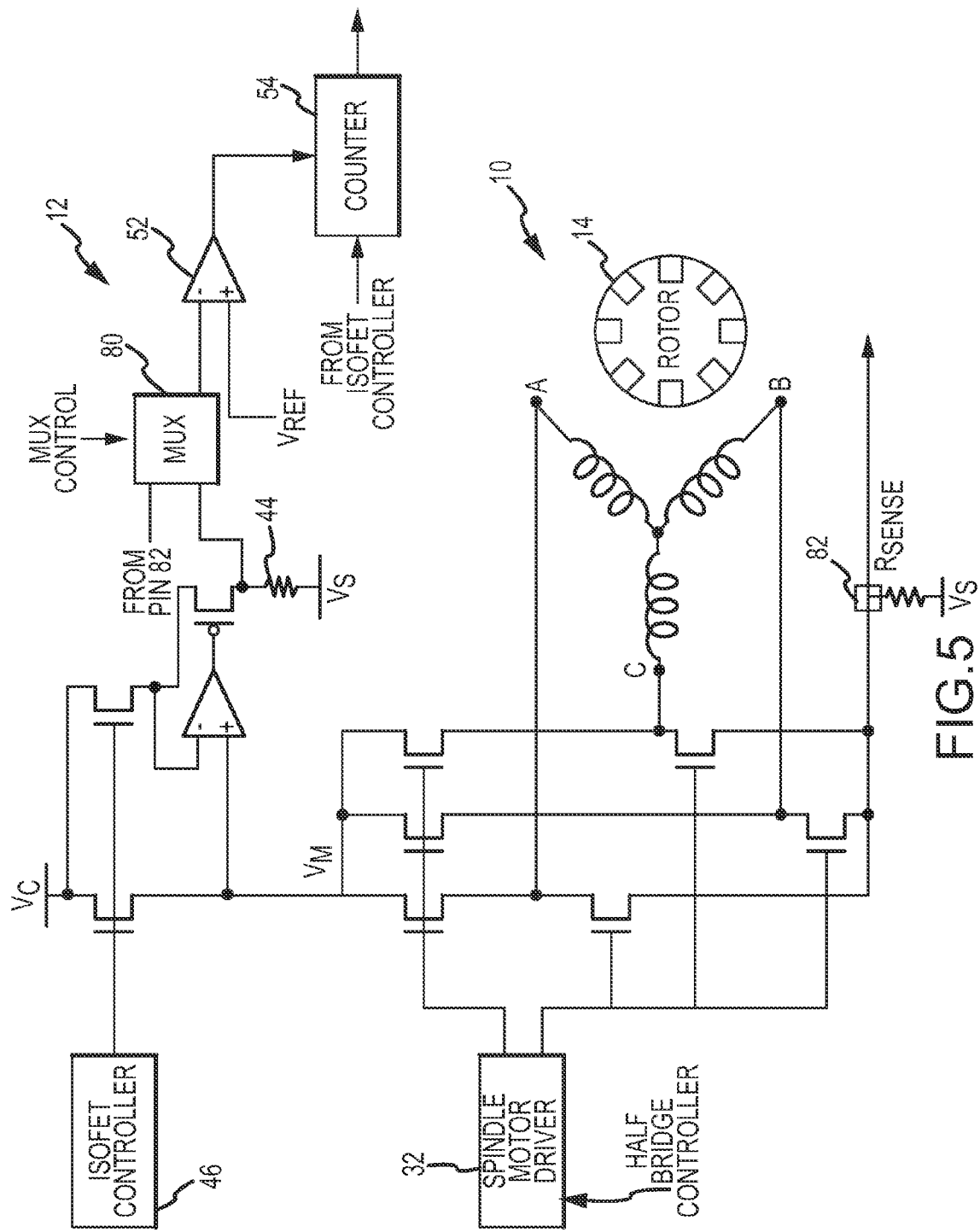
FIG. 5 is a schematic diagram of the motor and of yet another embodiment of the motor controller of FIG. 1.

FIG. 5 is a schematic diagram of the motor 10 and of an embodiment of the motor controller 12 of FIG. 2, where like numbers are used reference components common to FIGS. 1-5.

The motor controller 12 of FIG. 5 may be similar to the motor controller of FIG. 2 except that the motor controller of FIG. 5 includes a multiplexer 80 that allows a user of the motor controller to generate $V_{SENSE}$ across a sense circuit that is external to the motor controller.

The motor controller 12 of FIG. 5 may include a pin 82 that is coupled to the sources of the low-side transistors $36_1$-$36_3$, and a user may couple a sense circuit, for example a sense resistor $R_{sense}$, between the pin 82 and the supply voltage $V_S$.

The multiplexer 80 has a control node, a first input node coupled to the internal sense circuit 44, and a second input node coupled to the pin 82.

When the motor controller 12 generates a MUX control signal having a first logic level on the multiplexer control node, the multiplexer 80 couples the first input node to the comparator 52 such that the motor controller 12 operates as described above in conjunction with FIG. 2.

But when the motor controller 12 generates the MUX control signal having a second logic level, the multiplexer 80 couples the second input node to the comparator 52 such that the comparator compares the voltage $V_{ext\_sense}$ across $R_{sense}$ to $V_{ref}$. In all other aspects, however, the motor controller 12 may operate as discussed above in conjunction with FIG. 2.

Still referring to FIG. 5, alternate embodiments are contemplated. For example, at least one of the alternate embodiments discussed above in conjunction with FIGS. 1-4 may apply to the motor 10 and the motor controller 12 of FIG. 5.

Figure 6:
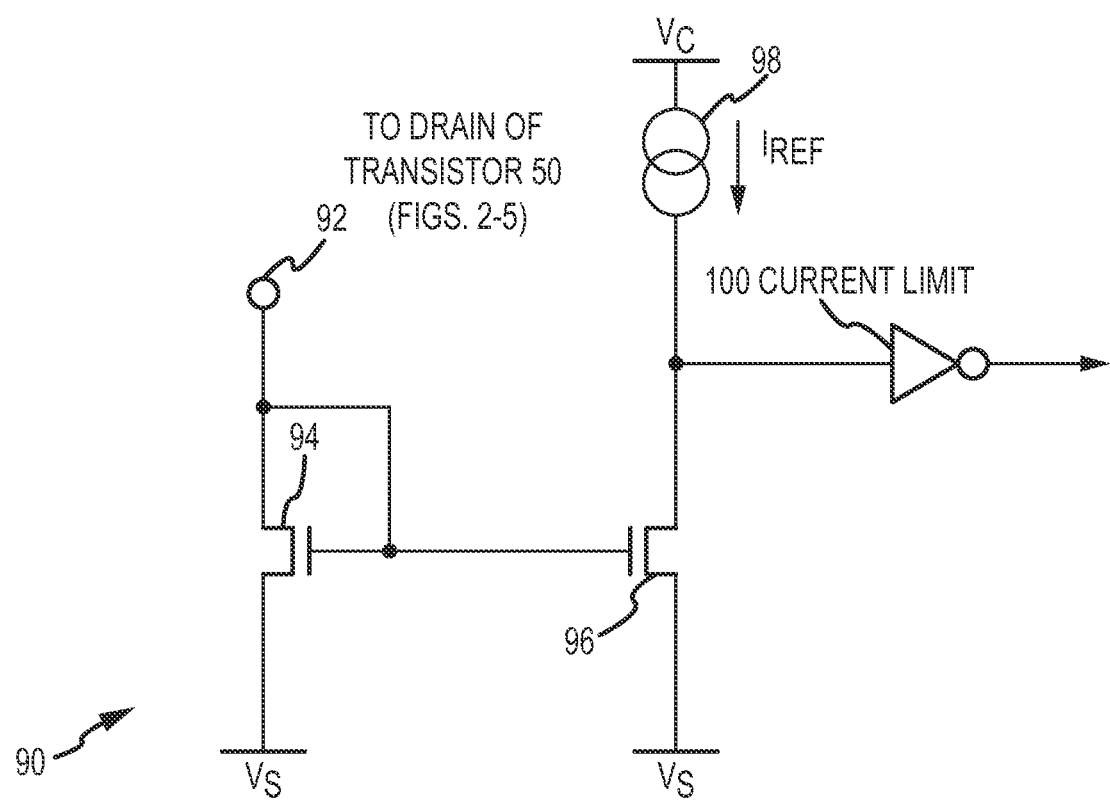
FIG. 6 is a schematic diagram of another embodiment of the internal sense circuit of FIGS. 2-5.

FIG. 6 is a schematic diagram of an embodiment of circuit 90 that may be used in place of the sense circuit 44 of FIGS. 2-5.

The circuit 90 is a current-limit indicator that generates a signal CURRENTLIMIT in response to the current through the ISOFET 38 (FIGS. 2-5) exceeding a safe value set by a reference current $I_{ref}$.

The circuit 90 includes a node 92, which is coupled to the drain of the PMOS transistor 50 of FIGS. 2-5, a current mirror formed by transistors 94 and 96, a current source 98 for generating $I_{ref}$, and an optional inverter-buffer 100 for generating the CURRENTLIMIT signal.

In operation during a motor start-up procedure, the transistor 94 presents an impedance (e.g., $RDS_{on}$) across which is generated the sense voltage $V_{SENSE}$.

In operation while the rotor 14 (FIGS. 2-5) is rotating at a steady-state speed, the transistor 94 conducts the current ISOFET/$N_{ACTUAL}$ that flows through the SENSEFET 40 (FIGS. 2-5). The mirror transistor 96 also conducts substantially the same current. Therefore, while ISOFET/$N_{ACTUAL}$<$I_{ref}$, the CURRENTLIMIT signal has a low logic level, which indicates that the current flowing through the ISOFET 38 is within a safe range. In contrast, if ISOFET/$N_{ACTUAL}$ becomes greater than $I_{ref}$, then the CURRENTLIMIT signal has a high logic level, which indicates a high-current condition. In response to a high-current condition, the motor controller 12 may take protective action. For example, the ISOFET controller 46 may deactivate the ISOFET 38 to prevent damage to the motor controller 12 and other circuitry. Alternatively, the half-bridge controller may reduce the drive signals to the transistors 34 and 36 to reduce the motor-coil currents to a safe range as discussed above in conjunction with FIG. 2. The latter action allows the motor 10 to continue operating.

Still referring to FIG. 6, alternate embodiments are contemplated. For example, the motor controller 12 may not take protective action until the CURRENTLIMIT signal has had a high logic level for at least a set period of time. Furthermore, the current scale factor between the transistors 94 and 96 may be other than unity. In addition, each of the transistors 94 and 96 may be any type of transistor other than an NMOS transistor.

Figure 7:
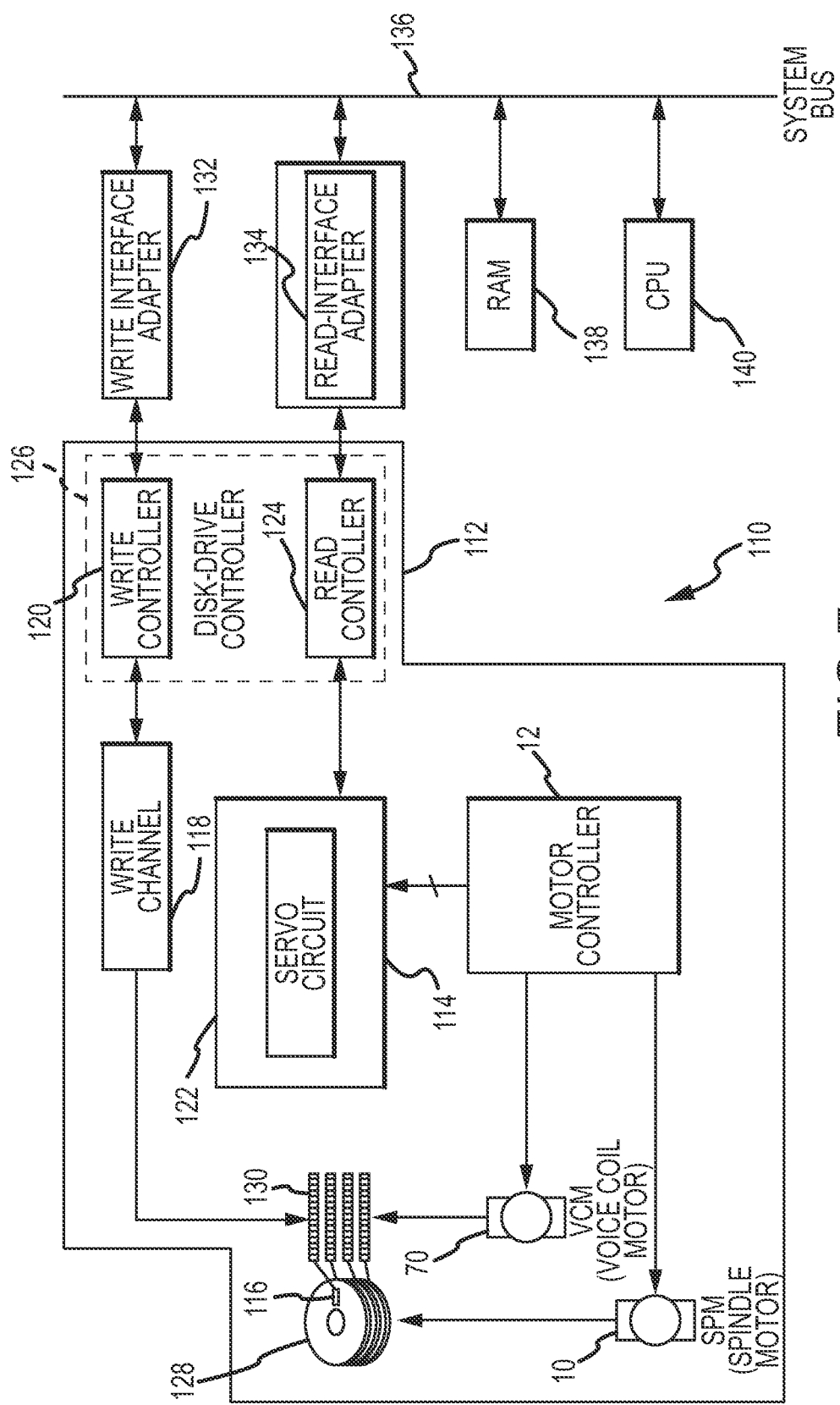
FIG. 7 is a block diagram of a disk-drive system that includes a motor and at least one of the embodiments of the motor controller of FIGS. 2-5.

FIG. 7 is a block diagram of a disk-drive system 110 that may incorporate the motor 10 and at least one of the embodiments of the motor controller 12 of FIGS. 2-5, where like numbers reference components common to FIGS. 2-5 and 7. The disk-drive system 110 includes a disk drive 112, which includes a servo circuit 114. The disk drive 112 includes a read-write head 116, a write channel 118 for generating and driving the head 116 with a write signal, and a write controller 120 for interfacing the write data to the write channel 118. The disk drive 112 also includes a read channel 122 for receiving servo and application-data read signals from the head 116 and for recovering data from these read signals, and includes a read controller 124 for organizing the read data. Together, the write and read controllers 120 and 124 compose a disk-drive controller 126. The read channel 122 includes the servo circuit 114, which receives the servo signal from the head 116, recovers the servo data from the servo signal, and provides the recovered servo data to the motor controller 12. The disk drive 112 further includes a storage medium such as one or more disks 128, each of which may contain data on one or both sides and which may be magnetic, optical, or another type of storage disk. The head 116 writes/reads the data stored on the disk 128, and is connected to a movable support arm 130. The servo circuit 114 calculates a position-error signal, and, in response to the error signal, the motor controller 12 provides a control signal to the voice-coil motor (VCM) 70, which positionally maintains/radially moves the arm 130 so as to positionally maintain/radially move the head 116 over the desired data tracks on the disks 128. The spindle motor (SPM) 10 rotates the disks 128, and the motor controller 12 starts the SPM and maintains the disks sp at a set rotational speed.

The disk-drive system 110 also includes write and read interface adapters 132 and 134 for respectively interfacing the disk-drive controller 126 to a system bus 136, which is specific to the system used. Typical system busses include ISA, PCI, S-Bus, Nu-Bus, etc. The system 110 typically has other devices, such as a random access memory (RAM) 138 and a central processing unit (CPU) 140 coupled to the bus 136.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

What is claimed is:

1. A motor controller, comprising:
   first, second, and third supply nodes;
   a motor-coil node;
   an isolator coupled between the first and second supply nodes and coupled between the first and third supply nodes, the isolator including a plurality of switchable elements;
   a motor driver coupled to the second supply node, the third supply node, and to the motor-coil node; and
   a motor position signal generator coupled to the isolator and configured to generate, in response to the isolator, a motor-position signal that is related to a position of a motor having at least one coil coupled to the motor-coil node.

2. The motor controller of claim 1, further comprising at least three motor-coil nodes coupled to the motor driver.

3. The motor controller of claim 1 wherein the motor driver comprises:
a half bridge having an input node and having an output node coupled to the motor-coil node; and
a half-bridge controller having an output node coupled to the input node of the half bridge.

4. The motor controller of claim 1 wherein the motor-position signal is related to an at-rest position of the motor.

5. The motor controller of claim 1 wherein the motor-position signal is related to a position of the motor while the motor is rotating.

6. A system, comprising:
a spindle motor having a stator that includes at least first, second, and third coils and that defines a space, the motor also having a rotor disposed within the space; and
a motor controller, comprising:
first, second, and third supply nodes;
first, second, and third motor-coil nodes respectively coupled to the first, second, and third coils of the motor;
an isolator coupled between the first and second supply nodes and coupled between the first and third supply nodes, the isolator including a plurality of switchable elements;
a motor driver coupled to the second supply node, the third supply node, and the motor-coil nodes; and
a motor position signal generator coupled to the isolator and configured to generate, in response to the isolator, a motor-position signal being related to a position of the rotor relative to the stator.

7. The system of claim 6 wherein the spindle motor comprises a brushless DC motor.

8. The system of claim 6 wherein the motor controller is disposed on a single integrated-circuit die.

9. A motor controller, comprising:
first, second, and third supply nodes;
a motor-coil node;
an isolator coupled between the first and second supply nodes and coupled between the first and third supply nodes;
a motor driver coupled to the second supply node, the third supply node, and to the motor-coil node; and
a motor position signal generator coupled to the isolator and configured to generate, in response to a current flowing between the first and second supply nodes, a motor-position signal that is related to a position of a motor having at least one coil coupled to the motor-coil node;
wherein the motor position signal generator is coupled to the first supply node; and
a third supply node coupled to the isolator, motor driver, and motor position signal generator.

10. A motor controller, comprising:
first and second supply nodes;
a motor-coil node;
an isolator coupled between the first and second supply nodes;
a motor driver coupled to the second supply node and to the motor-coil node; and
a motor position signal generator coupled to the isolator and configured to generate, in response to the isolator, a motor-position signal that is related to a position of a motor having at least one coil coupled to the motor-coil node;
wherein the motor position signal generator is coupled to the first supply node; and
a third supply node coupled to the isolator, motor driver, and motor position signal generator.

11. A motor controller, comprising:
first and second supply nodes;
a motor-coil node;
an isolator coupled between the first and second supply nodes;
a motor driver coupled to the second supply node and to the motor-coil node; and
a motor position signal generator coupled to the isolator and configured to generate, in response to the isolator, a motor-position signal that is related to a position of a motor having at least one coil coupled to the motor-coil node;
wherein the motor position signal generator is coupled to the first supply node; and
a ground node coupled to the isolator, motor driver, and motor position signal generator.

12. A motor controller, comprising:
first and second supply nodes;
a motor-coil node;
an isolator coupled between the first and second supply nodes;
a motor driver coupled to the second supply node and to the motor-coil node; and
a motor position signal generator coupled to the isolator and configured to generate, in response to the isolator, a motor-position signal that is related to a position of a motor having at least one coil coupled to the motor-coil node;
wherein the isolator comprises:
a first transistor having a first size, a control node, a first conduction node coupled to the first supply node, and a second conduction node coupled to the second supply node;
a second transistor having a second size that is smaller than the first size, a control node coupled to the control node of the first transistor, a first conduction node coupled to the first supply node, and a second conduction node coupled to the motor position signal generator; and
a control circuit coupled to the control nodes of the first and second transistors.

13. A motor controller, comprising:
first and second supply nodes;
a motor-coil node;
an isolator coupled between the first and second supply nodes;
a motor driver coupled to the second supply node and to the motor-coil node; and
a motor position signal generator coupled to the isolator and configured to generate, in response to the isolator, a motor-position signal that is related to a position of a motor having at least one coil coupled to the motor-coil node;
wherein the isolator comprises:
a first transistor having a first size, a control node, a first conduction node coupled to the first supply node, and a second conduction node coupled to the second supply node;
a second transistor having a second size that is smaller than the first size, a control node coupled to the control node of the first transistor, a first conduction node coupled to the first supply node, and a second conduction node;
a third transistor having a control node, a first conduction node coupled to the second conduction node of the second transistor, and a second conduction node coupled to the motor position signal generator;
an amplifier having a first input node coupled the second conduction node of the first transistor, a second input node coupled to the second conduction node of the second transistor, and having an output node coupled to the control node of the third transistor; and
a control circuit coupled to the control nodes of the first and second transistors.

14. A motor controller, comprising:
first and second supply nodes;
a motor-coil node;
an isolator coupled between the first and second supply nodes;
a motor driver coupled to the second supply node and to the motor-coil node; and
a motor position signal generator coupled to the isolator and configured to generate, in response to the isolator, a motor-position signal that is related to a position of a motor having at least one coil coupled to the motor-coil node;
the motor controller further comprising:
a third supply node; and
wherein the isolator comprises:
a first transistor having a first size, a control node, a first conduction node coupled to the first supply node, and a second conduction node coupled to the second supply node;
a second transistor having a second size that is smaller than the first size, a control node coupled to the control node of the first transistor, a first conduction node coupled to the first supply node, and a second conduction node;
a third transistor having a control node, a first conduction node coupled to the second conduction node of the second transistor, and a second conduction node coupled to the motor position signal generator;
a sense circuit coupled between the second conduction node of the third transistor and the third supply node; and
a control circuit coupled to the control nodes of the first and second transistors.

15. A motor controller, comprising:
first and second supply nodes;
a motor-coil node;
an isolator coupled between the first and second supply nodes;
a motor driver coupled to the second supply node and to the motor-coil node; and
a motor position signal generator coupled to the isolator and configured to generate, in response to the isolator, a motor-position signal that is related to a position of a motor having at least one coil coupled to the motor-coil node;
wherein the motor position signal generator comprises an amplifier having an input node coupled to the isolator, having an output node, and configured to generate the motor-position signal on the amplifier output node.

16. A motor controller, comprising:
first and second supply nodes;
a motor-coil node;
an isolator coupled between the first and second supply nodes;
a motor driver coupled to the second supply node and to the motor-coil node; and
a motor position signal generator coupled to the isolator and configured to generate, in response to the isolator, a motor-position signal that is related to a position of a motor having at least one coil coupled to the motor-coil node;
wherein the motor position signal generator comprises an amplifier having an input node coupled to the isolator, having an output node, and configured to generate the motor-position signal on the amplifier output node, the motor-position signal being related to a current flowing through the isolator.

17. A motor controller, comprising:
first and second supply nodes;
a motor-coil node;
an isolator coupled between the first and second supply nodes;
a motor driver coupled to the second supply node and to the motor-coil node; and
a motor position signal generator coupled to the isolator and configured to generate, in response to the isolator, a motor-position signal that is related to a position of a motor having at least one coil coupled to the motor-coil node;
wherein the motor position signal generator comprises:
an amplifier having an input node coupled to the isolator, having an output node, and configured to generate the motor-position signal on the amplifier output node; and
a counter coupled to the amplifier and configured to cause the amplifier to maintain the motor-position signal in response to the counter having a value.

18. A motor controller, comprising:
first and second supply nodes;
a motor-coil node;
an isolator coupled between the first and second supply nodes;
a motor driver coupled to the second supply node and to the motor-coil node; and
a motor position signal generator coupled to the isolator and configured to generate, in response to the isolator, a motor-position signal that is related to a position of a motor having at least one coil coupled to the motor-coil node;
wherein the motor position signal generator comprises a comparator having an input node coupled to the isolator, having an output node, and configured to generate the motor-position signal on the comparator output node.

19. A motor controller, comprising:
first and second supply nodes;
a motor-coil node;
an isolator coupled between the first and second supply nodes;
a motor driver coupled to the second supply node and to the motor-coil node; and
a motor position signal generator coupled to the isolator and configured to generate, in response to the isolator, a motor-position signal that is related to a position of a motor having at least one coil coupled to the motor-coil node;
wherein the motor position signal generator comprises a comparator having an input node coupled to the isolator, having an output node, configured to generate the motor-position signal on the comparator output node, and configured to transition the motor-position signal in response to a magnitude of a current flowing through the isolator being greater than a threshold value.

20. A motor controller, comprising:
first and second supply nodes;
a motor-coil node;
an isolator coupled between the first and second supply nodes;
a motor driver coupled to the second supply node and to the motor-coil node; and
a motor position signal generator coupled to the isolator and configured to generate, in response to the isolator, a motor-position signal that is related to a position of a motor having at least one coil coupled to the motor-coil node;
wherein the motor position signal generator comprises:
a comparator having an input node coupled to the isolator, having an output node, and configured to generate the motor-position signal on the comparator output node; and
a counter coupled to the comparator and configured to store a count value related to a time period between a time at which a current starts to flow through the isolator and at a time at which the comparator transitions the motor-position signal.

21. A motor controller, comprising:
first and second supply nodes;
a motor-coil node;
an isolator coupled between the first and second supply nodes;
a motor driver coupled to the second supply node, and to the motor-coil node; and
a motor position signal generator coupled to the isolator and configured to generate, in response to the isolator, a motor-position signal that is related to a position of a motor having at least one coil coupled to the motor-coil node;
wherein the motor position signal generator comprises:
a comparator having a first input node coupled to the isolator, having a second input node coupled to receive a threshold signal, having an output node, configured to generate the motor-position signal on the comparator output node, and configured to transition the motor-position signal in response to a magnitude of a current flowing through the isolator being greater than a magnitude of the threshold signal; and
a counter coupled to the comparator and configured to store a count value related to a time period between a time at which the current starts to flow through the isolator and at a time at which the magnitude of the current surpasses the magnitude of the threshold signal.

* * * * *